United States Patent [19]
Teague et al.

[11] 3,802,061
[45] Apr. 9, 1974

[54] PROCESS FOR SPLICING AND DRAWING METALLIC STRAND AND WIRE ARTICLE MADE THEREBY

[75] Inventors: James E. Teague, Sycamore, Ill.; Donald S. Medrick, Woodbury, Conn.; Clermont J. Snyder, Sarasota, Fla.

[73] Assignee: The Anaconda Company, New York, N.Y.

[22] Filed: Sept. 8, 1972

[21] Appl. No.: 287,324

[52] U.S. Cl................... 29/470.1, 29/487, 148/127
[51] Int. Cl............................................. B23k 31/02
[58] Field of Search ............. 29/470.1, 487; 219/57, 219/101; 148/127; 72/286; 140/111, 112

[56] References Cited
UNITED STATES PATENTS

| | | | |
|---|---|---|---|
| 3,340,596 | 9/1967 | Rozmus | 29/470.1 |
| 2,564,391 | 8/1951 | Burns | 148/127 |
| 2,627,009 | 1/1953 | Corson et al. | 219/101 |
| 3,259,969 | 7/1966 | Tessmann | 29/487 |
| 3,264,732 | 8/1966 | Fannon | 29/487 |
| 3,621,176 | 11/1971 | Valente | 219/57 |

*Primary Examiner*—Lowell A. Larson
*Attorney, Agent, or Firm*—Victor F. Volk

[57] ABSTRACT

In a continuous wire drawing operation the coils of rod or wire paying into a wire drawing apparatus are butt-welded by the application of high pressure at room temperature and each of the welds is resistance annealed without heating the remainder of the rod or wire.

15 Claims, 1 Drawing Figure

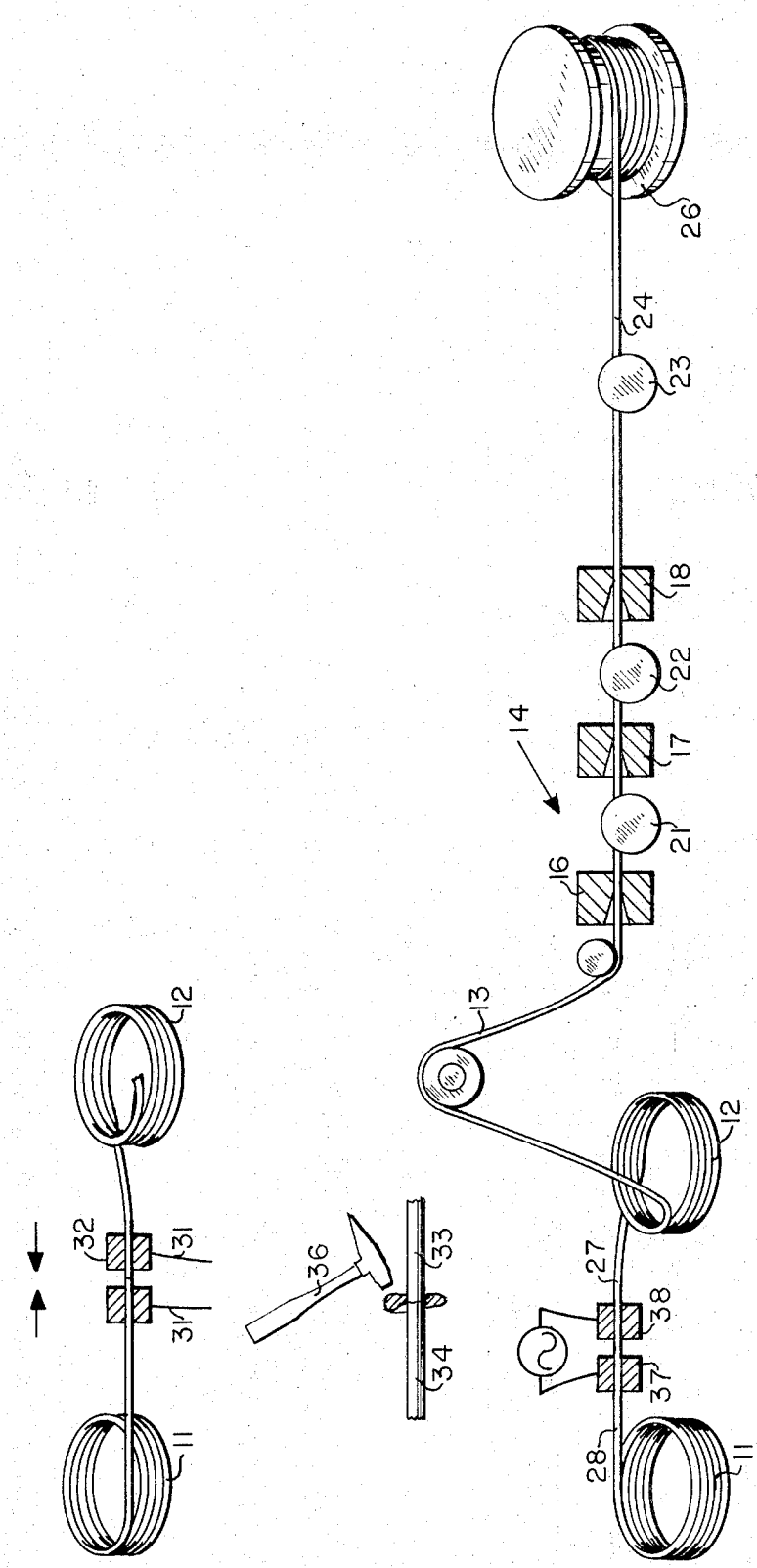

PROCESS FOR SPLICING AND DRAWING METALLIC STRAND AND WIRE ARTICLE MADE THEREBY

BACKGROUND OF THE INVENTION

In the manufacture of wire and particularly nonferrous wire for electrical conductor it is highly desirable, for economic operation, to have uninterrupted passage of wire through the wire drawing machines for long periods of time. Since advances in the arts of wire drawing have greatly increased drawing speeds in recent years the requirement for continuous operation demands that coils of rod or large wire to be drawn should be connected to form continuous lengths with splices that will pass through the wire drawing machines as well as the bulk of the rod or wire itself. In the passage through wire drawing dies the wire is work hardened and a splice that passes through one or more drawing dies without mishap may break in a die further downstream due to the fact that it has become embrittled to a greater extent than the bulk of the wire.

Where, for the sake of running the drawing machine without interruption, splices have been made that do not break in the dies, it may still be necessary to cut out the lengths of wire formed from the spliced area of the rod for failure to meet electrical or mechanical specifications. The cutting out is undesirable because it requires means for locating the splice in the finished product and, of course, limits the final continuous wire lengths.

At least in copper and aluminum and their alloys the most common method of splicing rod or wire, subject to further cold drawing, utilizes fusion butt welds where heat for the fusion is generated by passing electric current through the strand. Successful fusion welding requires precise control, fast-acting pressure systems, and high current capacity, particularly for aluminum. Fusion welds generate a heat-affected zone which may include oxides and a porous cast structure. In copper, fusion welds are characterized by large grain structures and eutectic precipitation of cuprous oxide in the heat affected zone adjacent to the weld. Where a fusion weld is made in a strand of heat sensitive alloy such as many of commercial aluminum alloys, the welded area will inevitably be affected. Indeed, in any metal that is not dead soft the splice formed by fusion welding will be softer than the bulk of the strand and may not workharden to satisfactorily match the remaining strand during drawing. In any event, in the actual experience of operating a wire mill, the number of breaks occurring during high speed drawing of fusion welded strand that were attributed to the splices, made it necessary to seek a better method of splicing.

In cold welding no heat is applied to the metals being welded, welding being effected by extremely high pressures that upset the butt ends against each other. Cold welding equipment suitable for copper, aluminum, and their alloys is available from the Kelsey-Hayes Co. of Philadelphia. The splices produced by cold-welding heavy strand, while they are free from heat affected zones, oxidation, or crystal growth, are severly work hardened and embrittled and unsuitable for cold drawing into fine sizes. Indeed it has been generally considered that cold-welding is unsuitable for splicing copper wire redraw rod, for this reason.

SUMMARY

We have invented process of splicing and drawing a metallic strand, using the expression "strand" for a range of sizes that include the structures usually called wire and those called rod, comprising the steps of upsetting the trailing end of one coil of the strand against the leading end of another coil by the application of high axial pressure at room temperature so as to form a cold weld between the ends. The cold weld is work hardened by the upsetting and we pass an electric current through it, but not through the bulk of the strand, for a short time such, preferably, as a time not exceeding sixty seconds, while the cold weld is substantially free from axial pressure, thereby heating the cold weld sufficiently to stress relieve but not to melt it. We then pull the strand, including the stress relieved cold weld through a plurality of drawing dies, thereby reducing the sectional area of the strand including the cold weld. Where a flash is retained around the cold weld it may or may not be removed before stress relieving, within the scope of our invention. Our invention has particular utility where the strand is copper, aluminum, electrical grade aluminum alloy or copper-clad aluminum. The strand is seized in split dies (jaws) adjacent to the ends prior to and during cold welding. These jaws may be separated from the strand and electrodes applied to the areas of the strand released from the jaws to pass electric current through the splice, but current can also, within the scope of our invention, be introduced into the cold weld through the jaws after the completion of the cold weld.

We have invented cold-drawn metal wire articles such for preferred examples, as copper, aluminum, electrical grade aluminum or copper alloy wire articles comprising at least one cold weld, cold-drawn with the wire. The cold weld has been locally stress relieved and is essentially indistinguishable from the remainder of the cold-drawn wire.

BRIEF DESCRIPTION OF THE DRAWING

The FIGURE represents the steps of the process of our invention and shows the welded, drawn wire thereof.

DETAILED DESCRIPTION OF PREFERRED EMBODIMENT

Coils 11, 12 of 5/16 inch diameter hot-rolled copper rod 13 are being cold drawn through wire drawing apparatus 14 having a plurality of dies and blocks here represented by dies 16, 17, 18 and blocks 21, 22, 23 to a size No. 10 Awg wire strand 24 being taken up on a reel 26. To insure a continuous uninterrupted run of strand through the apparatus 14 a trailing end 27 of the coil 12 has been spliced to a leading end 28 of the coil 11, a trailing end 29 of which can be spliced to the leading end of another coil, and so on, indefinitely. The butt ends of the coil are spliced by cold welding at room temperature. For this purpose they are gripped in jaws 31, 32 of a cold welder and pressed together to upset the metal. Two or three upsets are usually required. The jaws 31, 32 symbolically represent a commercially available cold welding machine, such as the Koldwelder of the Kelsey-Hayes Co., already mentioned, capable of exerting the extremely high forces that are required to upset large areas of copper and other metals without heating them, the jaws taking the form of precisely machined split dies. A flash 33 of extruded metal normally surrounds a cold-welded splice 34 which can be tapped off, as by a hammer 36 followed by filing as necessary. So far the description of our process has included steps that are conventional for cold weldings that will not be further drawn down. A novel step, however, and one that is essential to the running of spliced copper rod through wire drawing resides in a local heating to stress relieve the cold-welded splice. This is done by gripping the spliced strand between two electrodes 37, 38 connected across a high current source capable of supplying sufficient current to heat the splice to 500°–1,000°F. An application of current for 4 seconds, bringing the copper to a temperature of about 680°F at current cut off allowed the continuous production of wire 24, No. 10 Awg, in which the splices were undetectible. The splices after current cut-off reached a peak temperature of 740°F. It is advantageous to use a current supply with automatic timing of the cut-off and such apparatus is commercially available from a plurality of sources. We prefer to knock off the flash 33 before annealing, while it is still very brittle at the strand surface. The area between electrodes will then be uniform from splice to splice. However, satisfactory stress relieving was accomplished with the flash still in place and its removal before heat treatment rather than after does not appear to be critical. Immediately after reaching their peak temperatures, which is no more than 1 to 2 seconds following current cut-off the splices are water quenched, or otherwise chilled. This prevents undue crystal growth and heating of the bulk of the strand in the coils, and comprises the preferred procedure. However in some application natural cooling without quenching has been sufficiently rapid to produce satisfactory splices.

The entire operation of splicing according to our process is a matter of a few moments and the stress relieving cycle only a few seconds. This short time requirement is important for economical operation and any stress relieving cycle extending more than 60 seconds is considered not only impractical but undesirable for its adverse effect on the bulk of the strand which has not been severly work hardened.

EXAMPLE NO. 1

Splicing of 5/16" Diam. Copper Rod Heat Relief of Cold Weld, One Upset

| Current Applied Secs. | Temp. at Shut off, °F | Max. Temp. | Tensile Strength psi |
|---|---|---|---|
| 0 | room | room | 30,160 |
| 3 | 520 | 550 | 31,440 |
| 4 | 680 | 740 | 27,990 |
| 5 | 920 | 990 | 20,020 |
| 6 | 1120 | 1150 | 33,490 |

From the data of Example No. 1 it was determined to use a 4 second current in production splicing of 5/16 inch copper rod, based on the drop in tensile strength at this setting.

EXAMPLE NO. 2

Splicing of ⅜" Diam. *Type M Aluminum Alloy Rod Stress Relief of Cold Weld, One Upset

| Current Applied Secs. | Temp. at Shut off, °F | Max. Temp. | Tensile Strength psi |
|---|---|---|---|
| 0 | room | room | 17,780 |
| 3 | 380 | 390 | 18,160 |
| 4 | 430 | 460 | 17,870 |
| 5 | 520 | 540 | 16,380 |
| 6 | 640 | 690 | 13,250 |

*Type M refers herein to a proprietary high strength, 62% conductivity aluminum of 99.4% purity.

From the data of Example No. 2 it was determined to use a 5 second current in production splicing of ⅜ inch Type M aluminum alloy.

The commercial apparatus conveniently available for applying current for the stress relief of cold welded splices usually provides a plurality of taps that can be selected but no ammeter or means for measuring temperature.

EXAMPLE NOS. 3-9.—TENSILE STRENGTH

| Weld time, secs. | No. 3, hot rolled Type M alloy | No. 4, hot rolled E.C. aluminum | No. 5, continuous cast E.C. aluminum | No. 6, hot rolled copper clad Type M alloy | No. 7, hot rolled copper clad E.C. aluminum supplier A | No. 8, hot rolled copper | No. 9 continuous cast E.C. aluminum supplier B |
|---|---|---|---|---|---|---|---|
| 0 | 19,380 | 18,540 | 16,920 | 25,060 | 25,640 | 33,870 | 17,750 |
| 3 | 19,180 | 18,330 | 16,520 | | | 34,780 | 18,320 |
| 4 | | | | 23,790 | 24,050 | | |
| 5 | 19,260 | 18,480 | 16,090 | | | 34,290 | 17,780 |
| 6 | | | | ¹ 16,350 | ¹ 16,570 | | |
| 8 | ¹ 17,180 | ¹ 15,140 | ¹ 15,370 | 13,440 | 13,550 | 33,760 | ¹ 16,710 |
| 10 | 12,230 | | | 13,250 | 13,010 | ¹ 32,010 | |
| 13 | | | | 11,350 | 9,220 | 30,310 | |
| 15 | | | | | | 29,850 | 9,580 |

¹ Determines time setting.

The apparatus for applying current also includes an automatic timer for applying the current. Our invention can readily be practiced with the use of such apparatus by selecting tap and timer settings based on preliminary testing of each size, metal, and temper of strand that will be spliced. The apparatus settings should be selected to produce a drop of about 2,000 psi in tensile strength. In Examples 3–9 this method was successfully used for selecting settings for the commercial cold-welding of splices in ⅜ inch diameter rod that was then routinely cold-drawn. The No. 10 tap of a Micromax J7A welder was used in each case.

In the process so far described the ends 27, 28 of strand are removed from the jaws 31, 32 of the cold welder and gripped by the electrodes 37, 38 for heating. The jaws 31, 32 are precision machined of high strength hardened steel and the described method avoids damage to the jaws by heating. Where the temperature of stress relieving will not have an adverse effect on the cold-welding jaws, however, they may serve as electrodes by being connected to suitable electrical leads and the current passed through the jaws themselves after the cold weld has been completed.

A further refinement for the selection of the optimum temperature for stress relieving strands of different sizes and materials comprises examination of lengthwise sections of splices that have been heated at an increasing range of temperatures, corresponding, conveniently, to an increasing length of time of current application, polished and etched in a known manner for metallurgical examination. An untreated cold weld section, so prepared, exhibits a sharply defined interfacial zone of crystalline distortion which becomes increasingly indistinguishable from the remaining structure as the stress relief temperature is increased up to a point beyond which annealing, characterized by crystal growth, becomes evident. Complete disappearance of any weld section distortion in the splice section prior to drawing is not necessary, however, for the satisfactory operation of our method, and we prefer to stop short of this degree of heating. Even when some evidence of the cold welded structure remains visible on the prepared section, we have been unable to locate the area of the splice, upon further drawing through a plurality of dies.

Although our invention has clear advantages for the splicing of hot rolled rod to be cold-drawn into wire it is also applicable to the splicing of cold-drawn wire that will be further cold-drawn into fine wire. In certain magnet wire operations it has been customary to stock No. 16 Awg or No. 27 Awg cold-drawn copper wire and to draw this down to No. 40 Awg and finer. To select a proper stress relief treatment after cold-welding cold-drawn wire, tap and time settings may be selected that, upon experiment, are found to bring the welded section to approximately the same tensile strength as the unspliced wire.

EXAMPLE NOS. 10–11

| Stress Relief Time Secs. | No. 10 Tensile Strength No. 16 Awg C.D. Copper | No. 11 No. 27 Awg C.D. Copper |
| --- | --- | --- |
| 0 | 61,270 | 35,750 |
| 2 | 56,960 | 32,440 |
| 3 | — | 31,440 |
| 4 | 33,580 | 31,250 |
| 5 | 33,480 | — |
| 6 | 35,780 | — |

From consideration of tensile strength data and inspection of photomicrographs of stress-relieved splice sections the following stress relieving settings were selected:

EXAMPLE NOS. 12–14

| No. | Current Apparatus | Tap Setting | Time Secs. | Metal | Size |
| --- | --- | --- | --- | --- | --- |
| 12 | J4A Microwelder | No. 4 | 4 | Soft Copper | No. 16 Awg |
| 13 | No. 26 *Strecker | No. 4 | 3½ | 5005 Alum. | ⅜" Rod Type |
| 14 | No. 26 *Strecker | No. 3 | 4½ | M. Alum. | ⅜" Rod |

*Supplied by August Strecker Co. of Limburg, West Germany

DISCUSSION

When a metal is plastically deformed at room temperature, as in cold welding, it is said to be cold worked and changes occur in its physical and mechanical properties. Work hardening increases its tensile and yield strength, hardness, and electrical resistance and decreases its ductility. If plastically deformed polycrystalline metals are examined by x-ray diffraction techniques, the metal will exhibit Debye-Scherrer diffraction lines that are broadened due to the complicated residual stresses remaining after the cold working process. Cold working greatly increases the number of dislocations in a metal from dislocation densities of $10^6$ to $10^8$ for a soft annealed state to about $10^{12}$ for a heavily cold-welded state. Dislocation configurations of this magnitude define regions of high strain energy and, for polycrystalline metal, are very complicated, corresponding to severe bending and twisting of the metal lattice. Such severe deformation characterizes weld joint interfaces produced in the polycrystalline copper or aluminum strands welded together in the above Examples. Etched macrographs of lengthwise sections through these splices prior to stress relieving reveal the high strain regions at the interface, showing a sharp edge distinction between the different regions in the microstructure. Upon hot weld treatment microphotographs of the weld interfaces reveal changes in weld structure corresponding to changes in mechanical structure. Stress relief by resistance heating provides selective relief due to the higher electrical resistivity of sections of the strand which have been most work hardened. The physical and mechanical properties that changed in cold-welding tend to recover their original values during the recovery stage. The fact that they don't recover at the same rate emphasizes the complicated nature of this stress relief process for which a complete explanation is not known. For example, a typical property, copper hardness, can be altered without a change in the microstructure, though the major change in hardness occurs with recrystallization of the copper matrix. Generally resistivity, a physical property, is almost completely recovered before the start of recrystallization. Recovery and recrystallization are two basically different phenomena. Recovery occurs as a decreasing rate with time under isothermal condition as the driving force for this reaction is consumed. Recrystallization occurs by a nucleation and growth process, beginning very slowly, increasing to a maximum rate, and then slowly decreasing. Consequently, for heavily worked copper, the recovery process starts at the beginning of the relief current flow and accounts for the initial energy release (stress relief). Recrystallization starts much later and accounts for the large energy release (structural transformation). Our treatment of cold welded joints is essentially limited to this part and does not continue to recrystallization or grain growth. The recovery phenomenon is too complicated a process to be described by the effects of time and temperature. Current theories are expressed in terms of polygonization and similar parameters. In deformed copper and aluminum, high temperature recovery is mainly considered to involve polygonization. At lower temperatures, other processes are of greater importance, such as subboundaries and vacancy mobilities.

We have invented a new and useful process and article of which the foregoing description has been exemplary rather than definitive and for which we desire an award of Letters Patent as defined in the following claims.

We claim:
1. The process of splicing and drawing a metallic strand in continuous lengths comprising the steps of:
   A. upsetting the trailing end of one coil of said strand against the leading end of another coil of said strand by the application of high axial pressure at room temperature so as to form a cold weld between said trailing and leading ends, said cold weld being work hardened by said upsetting,
   B. passing electric current through said cold weld but not through the bulk of said strand for a short time while said cold weld is substantially free from axial pressure, thereby heating said cold weld sufficiently to stress relieve but not to melt said cold weld,
   C. rapidly cooling the stress relieved cold weld, and
   D. pulling said strand including said stress relieved cold weld through a plurality of drawing dies thereby reducing the sectional area of said strand including said cold weld.

2. The process of claim 1 wherein a flash is retained around said cold weld and said flash is removed from said strand prior to stress relieving said cold weld.

3. The process of claim 1 wherein a flash is retained around said cold weld and said flash is removed from said strand after stress relieving said cold weld but before die drawing the welded portion of said strand.

4. The process of claim 1 wherein said strand comprises copper.

5. The process of claim 1 wherein said strand consists of aluminum.

6. The process of claim 1 wherein said strand comprises copper-clad aluminum.

7. The process of claim 1 wherein said strand comprises electrical grade aluminum alloy.

8. The process of claim 1 wherein said time does not exceed 60 seconds.

9. The process of claim 1 wherein said strand is seized in jaws adjacent to said ends during said cold welding and comprising the steps of separating said jaws from said strand upon the completion of said cold weld, applying electrodes to areas of said strand released from said jaws and passing said current into said cold weld through said electrodes.

10. The process of claim 1 wherein said strand is seized in jaws adjacent to said ends during said cold welding and said current is introduced into said cold weld through said jaws after the completion of said cold weld.

11. A cold-drawn metal wire article comprising at least one cold weld, cold-drawn with said wire, said cold weld having been locally stress relieved and being essentially indistinguishable in physical and electrical properties from the remainder of said cold-drawn wire.

12. The wire of claim 11 wherein said metal consists of copper.

13. The wire of claim 11 wherein said metal consists of aluminum.

14. The wire of claim 11 wherein said metal comprises electrical grade aluminum alloy.

15. The wire of claim 11 wherein said metal comprises electrical grade copper alloy.

* * * * *